G. M. WILLIS.
RESILIENT WHEEL.
APPLICATION FILED AUG. 27, 1919.
1,396,984. Patented Nov. 15, 1921.
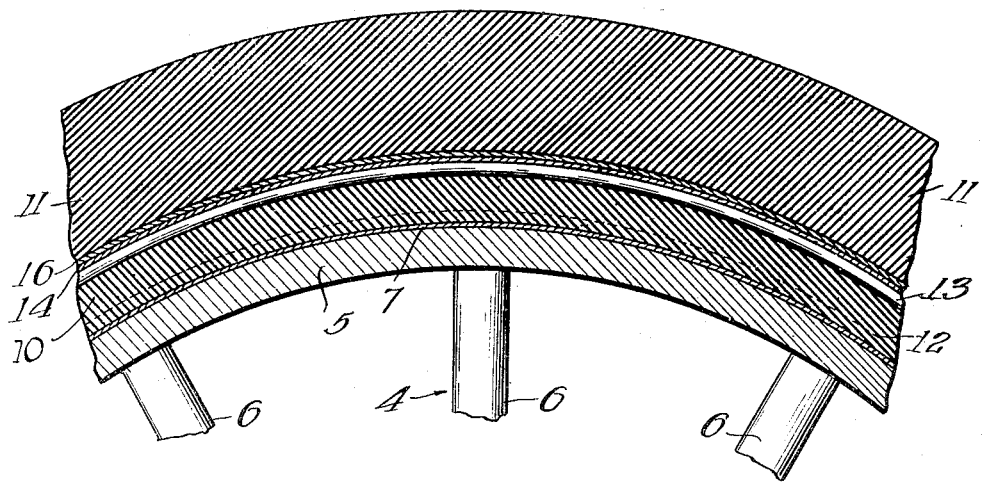
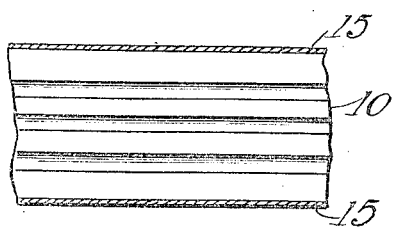
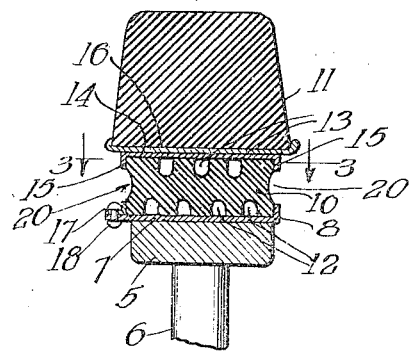
Witnesses:
Inventor:
George M. Willis ively high degree of resiliency,
UNITED STATES PATENT OFFICE.

GEORGE M. WILLIS, OF CHICAGO, ILLINOIS.

RESILIENT WHEEL.

1,396,984.  Specification of Letters Patent.  Patented Nov. 15, 1921.

Application filed August 27, 1919. Serial No. 320,078.

*To all whom it may concern:*

Be it known that I, GEORGE M. WILLIS, a citizen of the United States, residing at Chicago, in the county of Cook and State of Illinois, have invented a certain new and useful Improvement in Resilient Wheels, of which the following is a full, clear, concise, and exact description, reference being had to the accompanying drawings, forming a part of this specification.

My invention relates to resilient wheels.

The present invention has particular reference to that class of vehicle wheels having in combination a resilient tread member and a confined inner cushioning member of a relatively high degree of resiliency, whereby there may be attained a resilience and shock absorbing capacity substantially equivalent to that of a pneumatically tired wheel, together with a durability such as to enable economical use of the wheel for heavy vehicles.

One of the main objects of the invention is to provide an improved form of cushioning member of maximum resiliency, and simple and inexpensive construction.

Another object is to provide an improved and simplified arrangement of mounting the cushioning member on the wheel felly, and of mounting the tire on the cushioning member.

The above objects are directed primarily to the end of providing a resilient wheel of extremely simple, rugged and inexpensive construction.

In the accompanying drawing, wherein I have illustrated one preferred embodiment of my invention to acquaint those skilled in the art with the manner of constructing and using the same:

Figure 1 is a fragmentary sectional view of the wheel taken through the circumferential plane thereof;

Fig. 2 is a fragmentary sectional view of the wheel taken on a transverse plane; and Fig. 3 is another fragmentary sectional view taken substantially on the plane of the line 3—3 of Fig. 2, looking in the direction indicated by the arrows.

The wheel comprises a standard wheel center, which I have broadly designated 4, and which consists of the felly 5, the spokes 6, and a central hub (not shown). The wheel center shown is of conventional wood construction, but it is to be understood that the employment of a metallic disk wheel center or other metallic formation of wheel center is also contemplated and included within the present invention. Around the outer wood felly 5 is secured a metallic felly rim 7. The felly rim is preferably shrunk on the felly in order to obtain the required rigidity between the felly and felly rim. In the case of a wheel center of metallic construction this felly rim may be dispensed with by turning off the periphery of the rim to a similar conformation. One edge of the felly rim 7, preferably the outer edge, is formed with an outwardly projecting marginal flange 8 extending circumferentially about the rim.

The shock absorbing cushion or pad element is mounted on this felly rim, and consists of a resilient cushion ring 10, preferably composed of a relatively soft grade of rubber having a maximum degree of resiliency for absorbing the shock transmitted through the outer tire 11. The resiliency of this rubber cushioning ring 10 is increased by the provision of a series of circumferential grooves or depressions 12 and 13, which are formed in the inner and outer peripheries of the cushion ring. By the provision of these circumferential grooves, the sectional area or volume of rubber subject to compression is materially reduced without a sacrifice of strength of the cushioning ring, and consequently a greater degree of resiliency is obtained. As shall presently appear, the cushion ring is confined between flanges which embrace the ring adjacent its inner and outer peripheries, and it will hence be seen that as a second function, the provision of these peripheral grooves also provides internal spaces into which the rubber between the flanges can expand when the rubber is placed under compression.

Around the outer circumference of the cushion ring 10 is mounted a metallic cushion rim 14 having marginal flanges 15—15, which project inwardly a short distance and closely embrace the sides of the cushion ring 10. The cushion ring is pressed into the rim 14 before mounting on the felly rim. The tire 11, which consists of the rubber tire proper and its associated tire rim 16, is mounted rigidly on the cushion rim 14. The mounting of the tire on the cushion rim 14 is made absolutely rigid by pressing the same thereon under hydraulic pressure in accordance with the usual practice. In making up the wheel, the felly rim 7 is first shrunk on the wheel center, the cushion-ring and its associated rim is then slipped over the felly rim and pushed up against the flange 8, where it is locked in place by a circumferential locking ring 17. This locking ring consists of an angularly flanged ring which is slipped over the felly rim and is riveted in place as indicated at 18. The elements thus far described compose the resilient wheel over which the regulation tire 11 is then pressed.

It will be noted that the lateral surfaces of the cushion ring are formed with concave formations 20—20, which are provided for the purpose of preventing the rubber under compression from extending beyond the edges of the flanges 8 and 15.

I do not intend to be limited to the particular details herein shown and described.

I claim:

In combination, a wheel comprising a combined felly and rim structure having a permanent flange on one side and having a removable flange for the other side, a ring of resilient rubber embracing said felly and being confined laterally between and engaging said flanges, said ring of rubber being recessed about its periphery to permit of radial compression and lateral expansion, a channeled ring of metal embracing the outer periphery of said ring of rubber said channeled ring having flanges extending inwardly, said flanges engaging and embracing the outer edges of the ring between them, and a standard tire comprising a metal rim and resilient rubber tread, said metal rim firmly embracing said channeled ring.

In witness whereof I hereunto subscribe my name this 25th day of August, A. D. 1919.

GEORGE M. WILLIS.